US011906316B2

(12) United States Patent
Lee (10) Patent No.: US 11,906,316 B2
(45) Date of Patent: Feb. 20, 2024

(54) DEVICE AND METHOD FOR GENERATING VEHICLE DATA-BASED BOARDING/ALIGHTING POINT INFORMATION

(71) Applicants: HYUNDAI MOTOR COMPANY, Seoul (KR); Kia Corporation, Seoul (KR)

(72) Inventor: Jang Yong Lee, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 221 days.

(21) Appl. No.: 17/385,249

(22) Filed: Jul. 26, 2021

(65) Prior Publication Data
US 2022/0034676 A1 Feb. 3, 2022

(30) Foreign Application Priority Data

Aug. 3, 2020 (KR) .......................... 10-2020-0096954

(51) Int. Cl.
*G01C 21/34* (2006.01)
(52) U.S. Cl.
CPC ..... *G01C 21/3492* (2013.01); *G01C 21/3423* (2013.01); *G01C 21/3438* (2013.01)
(58) Field of Classification Search
CPC ............ G01C 21/3492; G01C 21/3423; G01C 21/3438; G01C 21/32; G01C 21/3667; G06Q 50/30; G01S 19/01; G06F 9/453
(Continued)

(56) References Cited

U.S. PATENT DOCUMENTS

2017/0227364 A1* 8/2017 Miura ..................... G01C 21/30
2017/0227365 A1* 8/2017 Miura ..................... G01C 21/30

FOREIGN PATENT DOCUMENTS

JP 2002-350157 A 12/2002
JP 2015040016 A * 3/2015

OTHER PUBLICATIONS

Estimating Inefficiency in Bus Trip Choices From a User Perspective With Schedule, Positioning, and Ticketing Data, Tarciso Braz, Matheus Maciel, Demetrio Gomes Mestre, Nazareno Andrade, Carlos Eduardo Pires, Andreza Raquel Queiroz, and Veruska Borges Santos (Year: 2018).*

(Continued)

*Primary Examiner* — Anne Marie Antonucci
*Assistant Examiner* — Jodi Marie Jones
(74) *Attorney, Agent, or Firm* — MORGAN, LEWIS & BOCKIUS LLP (57) ABSTRACT

A device for generating vehicle data-based boarding and alighting point information includes a time series data processor that resamples a plurality of time series data including first speed data of the vehicle based on a preset first time; a GPS data processor that resamples GPS data including second speed data of the vehicle based on a preset second time, a location data deriving device that integrates the time series data and the GPS data based on the first speed data, the second speed data, and DTW algorithm, and obtains location data of the vehicle from the integrated data; a location integrating device that integrates location information of a vehicle boarding point and an alighting point received from a public institution; and an identifier generator that generates a boarding point identifier and an alighting point identifier related to a location of the boarding point and the alighting point, respectively.

16 Claims, 8 Drawing Sheets

(58) Field of Classification Search
USPC ....... 701/533, 532, 117, 410, 423, 400, 409,
701/408, 465, 468, 411, 461, 469, 537,
701/119, 450, 25, 527, 300, 412, 430,
701/416, 424, 120, 123, 26, 467, 22, 522,
701/445, 417, 32.5, 442, 508, 507, 79,
701/110, 33.6
See application file for complete search history.

(56) References Cited

OTHER PUBLICATIONS

Machine Translation JP 2015040016 (Year: 2015).*

* cited by examiner

DEVICE AND METHOD FOR GENERATING VEHICLE DATA-BASED BOARDING/ALIGHTING POINT INFORMATION

CROSS-REFERENCE TO RELATED APPLICATION

This application claims the benefit of priority to Korean Patent Application No. 10-2020-0096954, filed in the Korean Intellectual Property Office on Aug. 3, 2020, the entire contents of which are incorporated herein by reference.

TECHNICAL FIELD

The present disclosure relates to a device and a method for generating vehicle boarding and alighting point information, and more particularly, to a device and a method for generating information on a vehicle boarding point and an alighting point based on vehicle data.

BACKGROUND

Currently, electric vehicles, especially electric buses, are in a continuous expansion trend with technological progress and government-level support. One of major prerequisites for local governments and bus companies is to determine whether there are no operational problems through estimated power consumption when replacing buses with the electric buses while maintaining an existing route system.

Global automobile OEMs, telecommunications companies, and startup companies are conducting monitoring and basic statistical analysis using real-time data of vehicles, but there is no technology to predict customized power consumption based on the bus and a route.

Therefore, there is a need for a method capable of accurately analyzing changing factors such as the vehicle, an external environment, and the like affecting an electric bus efficiency for each section between bus stops.

In addition, it is also necessary to synchronize the vehicle time series data and GPS data used to implement such method, and to identify data consistency.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a device and a method capable of accurately analyzing change factors such as a vehicle, an external environment, and the like that affect an electric vehicle efficiency for each vehicle boarding and alighting point section.

Another aspect of the present disclosure provides a device and a method capable of synchronizing vehicle time series data and GPS data used to implement the method, and identifying data consistency.

Another aspect of the present disclosure provides a device and a method capable of performing data integration that may be applied when storing and managing collected data.

Another aspect of the present disclosure provides a device and a method capable of measuring a sophisticated location of the vehicle through time axis adjustment and implementing algorithm that may be utilized for various location-based analyses.

Another aspect of the present disclosure provides a device and a method capable of generating vehicle boarding/alighting point unit information subdivided under an operation unit for information on vehicles operating on the same route.

Another aspect of the present disclosure provides a device and a method capable of identifying an operation pattern between a starting point and an ending point of the vehicle boarding/alighting point section to identify more accurate operation information.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for generating vehicle data-based boarding point and alighting point information includes a processor which comprises: a time series data processor configured to resample a plurality of time series data based on a preset first time, wherein the plurality of time series data are received from a plurality of sensors included in a vehicle and include first speed data of the vehicle; a GPS data processor configured to resample GPS data based on a preset second time, wherein the GPS data are related to a GPS of the vehicle and include second speed data of the vehicle, a location data deriving device that integrates the time series data and the GPS data based on the first speed data, the second speed data, and DTW algorithm, and obtain location data of the vehicle from the integrated data; a location integrating device that integrates location information of a vehicle boarding point and a vehicle alighting point received from a public institution, and an identifier generator that generates a boarding point identifier and an alighting point identifier related to a location of the boarding point and the alighting point, respectively, in the location data of the vehicle based on the location information of the vehicle boarding point and the alighting point.

In one implementation, the time series data output from the plurality of sensors may include a plurality of variable data output at different time periods, and the time series data processor may resample the plurality of variable data based on the first time.

In one implementation, the GPS data may include data on a latitude, a longitude, an azimuth, a second speed, and an altitude, and the GPS data processor may generate a table obtained by extracting at least one of the data on the latitude, the longitude, the azimuth, the second speed, or the altitude with a predetermined period of time.

In one implementation, the location data deriving device may calculate Euclidean distances of the first speed data and the second speed data for each time axis, derive minimum distance ordered pairs with minimum Euclidean distances, and integrate the time series data and the GPS data based on the ordered pairs.

In one implementation, the location data deriving device may compare the first speed data with the second speed data to correct a time delay.

In one implementation, the location integrating device may derive the location information of the vehicle boarding/alighting point by integrating a plurality of public institution APIs.

In one implementation, the location integrating device may derive the location information of the vehicle boarding/alighting point based on a speed for each major city route, the number of passengers for each boarding/alighting point of a whole country, and the number of passengers for each route for a specific region.

In one implementation, the identifier generator may generate a turning identifier related to a turning point in the location data of the vehicle based on turning point information of the vehicle obtained from the location integrating device.

In one implementation, the identifier generator may identify a boarding/alighting point arrival point of time of the vehicle based on the location information of the boarding/alighting point obtained from the location integrating device, and generate the boarding/alighting point identifier in the location data of the vehicle corresponding to the boarding/alighting point arrival point of time.

According to another aspect of the present disclosure, a method for generating vehicle data-based boarding point and alighting point information includes: a time series data processing operation of receiving a plurality of time series data including first speed data of a vehicle from a plurality of sensors included in the vehicle, and resampling the time series data based on a preset first time; a GPS data processing operation of resampling GPS data related to a GPS of the vehicle and including second speed data of the vehicle based on a preset second time; a location data deriving operation of integrating the time series data and the GPS data based on the first speed data, the second speed data, and DTW algorithm, and obtaining location data of the vehicle from the integrated data; a location integrating operation of integrating location information of a vehicle boarding point and a vehicle alighting point received from a public institution; and an identifier generating operation of generating a boarding point identifier and an alighting point identifier related to a location of the boarding point and the alighting point, respectively, in the location data of the vehicle based on the location information of the vehicle boarding/alighting point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

Figure 1:
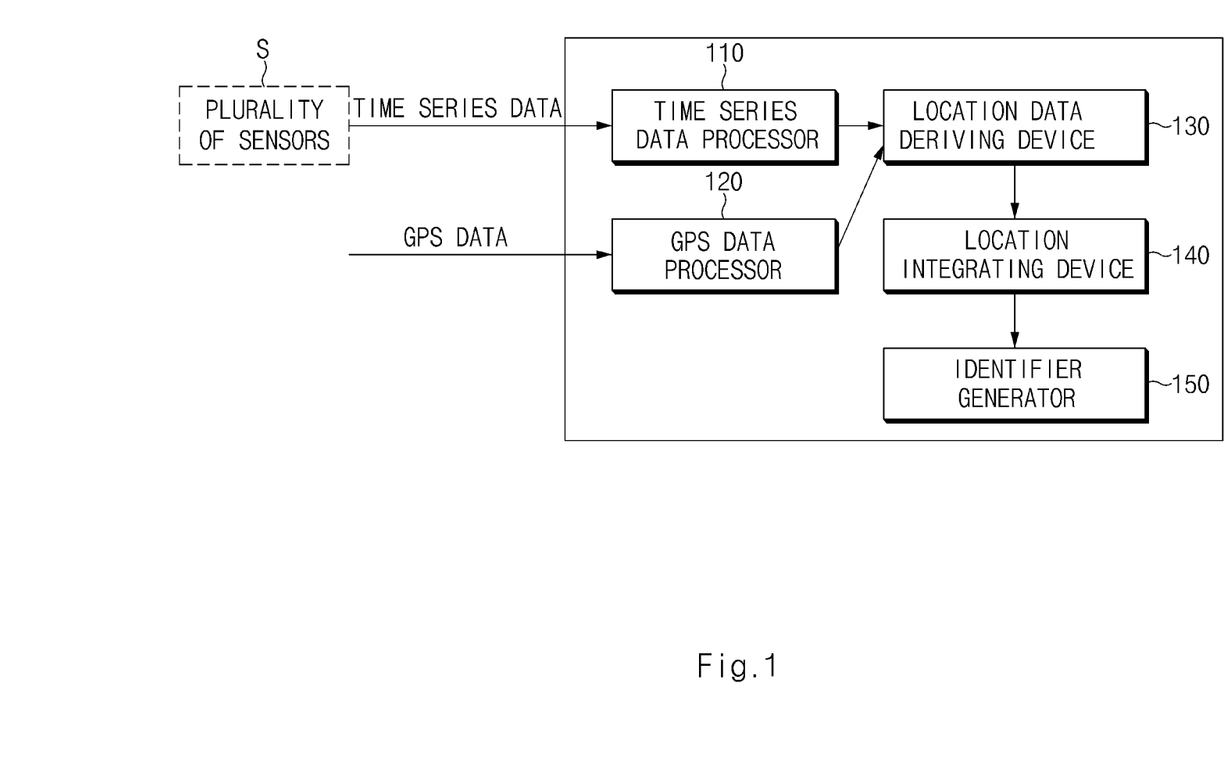
FIG. 1 is a control block diagram of a device for generating vehicle data-based boarding/alighting point information according to an embodiment of the present disclosure.

FIG. 1 is a control block diagram of a device for generating vehicle data-based boarding/alighting point information according to an embodiment of the present disclosure.

As shown, a device for generating boarding/alighting point information may include a time series data processor 110, a GPS data processor 120, a location data deriving device 130, a location integrating device 140, and an identifier generator 150.

The boarding/alighting point information generating device according to the present embodiment is a device that derives information on a boarding/alighting point (e.g., a bus stop) at which a vehicle stops based on vehicle data provided by the vehicle, particularly a bus, a shuttle bus such as a school bus or a commuter bus, or a vehicle that is repeatedly operated in a certain section. The boarding/alighting point information generating device may be installed inside the vehicle or may be implemented as an external server that provides the boarding/alighting point information to the vehicle. The boarding/alighting point information generating device may be a device driven under management of a vehicle company that operates the vehicle or a public institution capable of managing and supervising the vehicle operation.

The time series data processor 110 may resample a plurality of time series data based on a preset first time, wherein the plurality of time series data are received from a plurality of sensors S included in the vehicle and include first speed data of the vehicle.

The time series data processor 110 may receive the time series data, through the plurality of sensors S, for example, an RPM sensor, a speed sensor, a steering wheel, a brake, and the like, and store the time series data. Such time series data may be variable data output from the sensor S at different time periods. The time series data processor 110 may synthesize such variable data, which are output at the different time periods, based on the first time, for example, with a cycle of 100 ms.

In the various embodiments of the present disclosure, each of the time series data processor 110, the GPS data processor 120, the location data deriving device 130, the location integrating device 140, and the identifier generator 150 may be a processor, a computer, or a control unit such as an electronic control unit (ECU), or integrated into one control unit.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Figure 2:
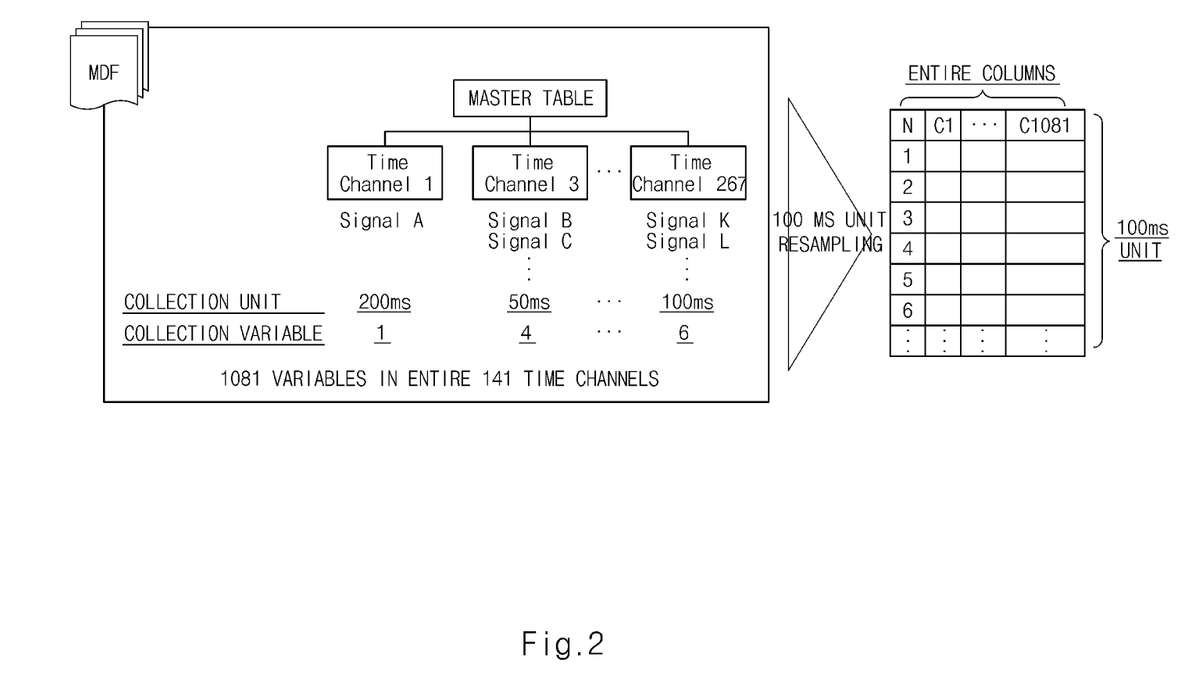
FIG. 2 is a diagram illustrating resampling of time series data according to an embodiment of the present disclosure.

FIG. 2 is a diagram illustrating resampling of time series data according to an embodiment of the present disclosure.

As shown, the plurality of sensors S in the vehicle output the plurality of variable data at various periods through a plurality of time channels. For example, one variable data may be output every 200 ms through a time channel 1, but 6 variable data may be output every 100 ms through a time channel 267. It may be identified in FIG. 2 that 1081 variable data are output through a total of 141 time channels, and a difference occurs in a format of the data and a data collection interval depending on sensor precision or data collection characteristics for each equipment.

The time series data processor 110 may resample such variable data in units of 100 ms time, thereby enhancing data interpretation ability and identifying consistency. That is, a difference based on a collection unit of the variable data may be canceled and the variable data may be normalized.

In this document, a speed of the vehicle that is to be processed or that has been resampled and processed by the time series data processor 110 may be referred to as first speed data.

The GPS data processor 120 may resample GPS data based on a preset second time, wherein the GPS data are related to a GPS of the vehicle and include second speed data of the vehicle. In various embodiments of the present disclosure, a speed of the vehicle that is to be processed or that has been resampled and processed by the GPS data processor 120 may be referred to as second speed data.

Figure 3:
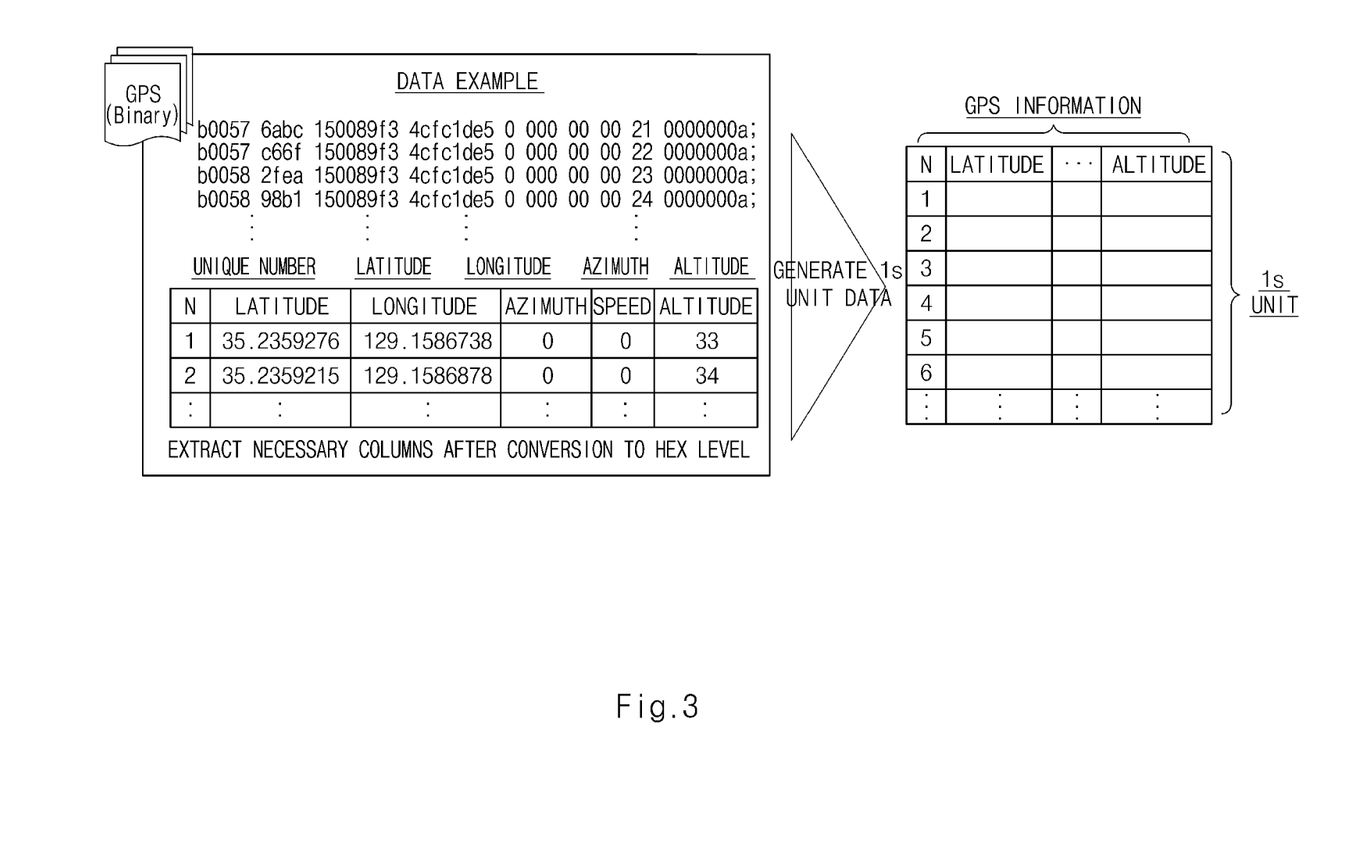
FIG. 3 is a diagram illustrating resampling of GPS data according to an embodiment of the present disclosure.

FIG. 3 is a diagram illustrating resampling of GPS data according to an embodiment of the present disclosure.

As shown in FIG. 3, the GPS data may include data on a latitude, a longitude, an azimuth, the second speed, and an altitude. The GPS data processor 120 may resample the GPS data by converting such data into a specific format and then extracting only necessary columns. The GPS data processor 120 according to the present embodiment may extract at least one, that is, only the necessary column from a table for the data on the latitude, the longitude, the azimuth, the second speed, and the altitude at a 1 second period to generate 1 second period data. The second time may be set to a value other than 1 second. In this connection, it will be clearly described that 1 second means a certain time set in advance as a specific example to illustrate the invention and does not exclude other times.

That is, the time series data processor 110 and the GPS data processor 120 according to the present embodiment parse the received data and the GPS data, and synchronize time intervals through the resampling process.

In one example, the first speed data of the time series data processor 110 and the second speed data of the GPS data processor 120 are common data among data that may be obtained from two data sources, which may be utilized to correct other data.

The location data deriving device 130 may integrate the time series data and the GPS data based on first speed data, the second speed data, and DTW algorithm, and derive location data of the vehicle from the integrated data.

The location data deriving device 130 corrects an error by comparing the first speed data and the second speed data, which are the same collection information of the two data sources, with each other to correct an inter-equipment collection error, for example, a time delay, which may occur when integrating the time series data and the GPS data.

To correct such data error, the location data deriving device 130 may utilize the dynamic time warping (DTW) algorithm. That is, the location data deriving device 130 may calculate Euclidean distances of the first speed data and the second speed data for each time axis, derive minimum distance ordered pairs with minimum Euclidean distances, and integrate the time series data and the GPS data based on the ordered pairs. That is, a comparison pair may be selected using two points of time with the minimum Euclidean distance as the ordered pair, the data integration may be performed around the comparison pairs, and other information in the equipment may be corrected based on the generated comparison pairs, thereby combining data with each other.

Figure 4:
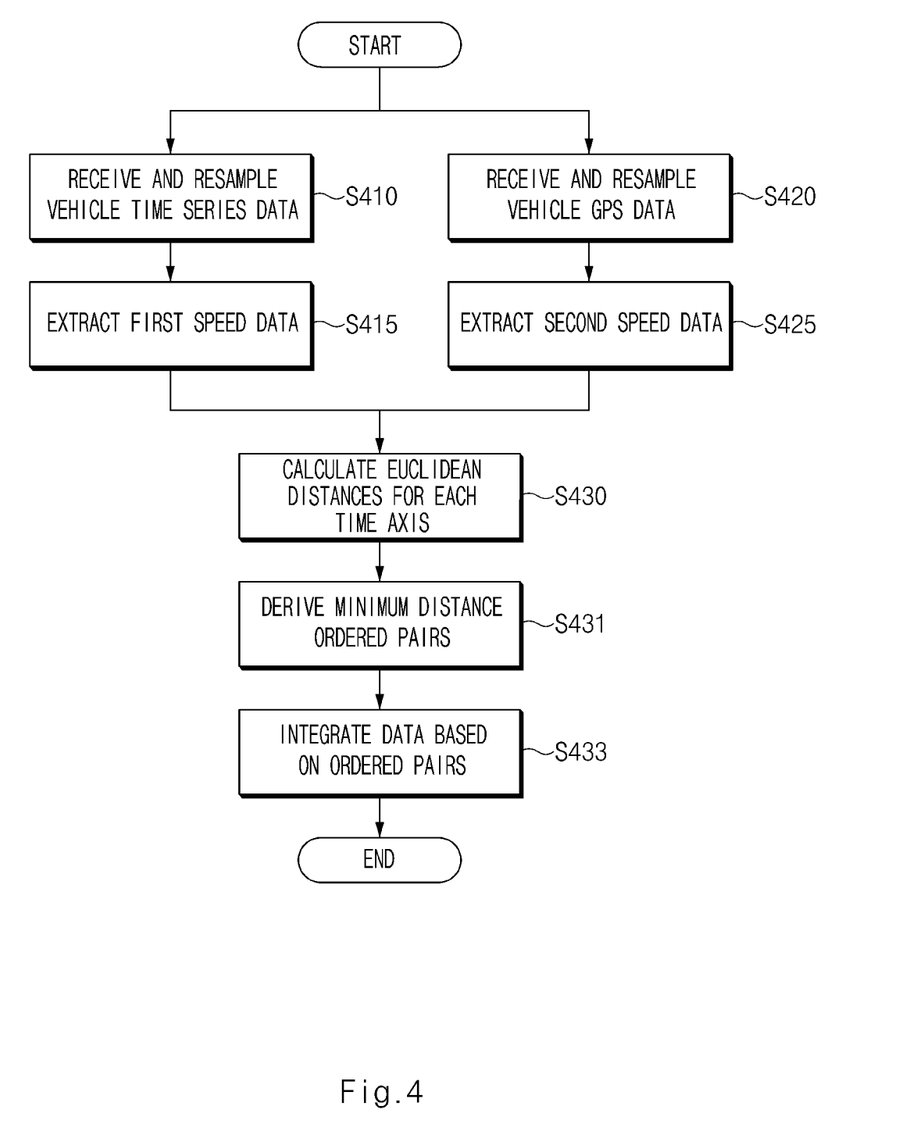
FIG. 4 is a control flowchart for illustrating data correction according to an embodiment of the present disclosure.

FIG. 4 is a control flowchart for illustrating data correction according to an embodiment of the present disclosure.

Individual operations in FIG. 4 may be performed by the time series data processor 110, the GPS data processor 120, and the location data deriving device 130. The processes described above will be summarized through FIG. 4 as follows.

First, the plurality of time series data including the first speed data of the vehicle may be received and stored by the time series data processor 110, and the time series data may be resampled, that is, processed based on the first time (S410).

When the data is processed as such, the time series data processor 110 extracts the first speed data of the vehicle from the time series data (S415).

Similarly, the GPS data processor 120 may receive and store the GPS data related to the GPS of the vehicle, and extract and process the received GPS data based on the second time (S420).

When the GPS data is processed as such, the GPS data processor 120 extracts the second speed data of the vehicle from the GPS data (S425).

In one example, when comparing the vehicle time series data with the GPS data, despite use of data collected in the same vehicle and at the same time zone, the time delay occurs. A trend of increasing or decreasing of such time delay may vary based on the time zone.

The location data deriving device 130 may correct the time delay based on the DTW algorithm to solve such problem. This means correcting the error by comparing the speed data, which are the same collection information of the two equipment, with each other.

The GPS data processor 120 may calculate the Euclidean distances of the first speed data and the second speed data for each time axis (S430), derive the minimum distance ordered pairs with the minimum Euclidean distances (S431), and integrate the time series data and the GPS data based on the ordered pairs (S433).

As the processes as shown in FIG. 4 are performed, when it is necessary to store and manage the collected data, the corresponding algorithm may be applied in a preprocessing process before the data storage, and the data may be managed in one table after the data integration. In addition, a sophisticated location of the vehicle may be measured through adjustment of the time axis, and the sophisticated location of the vehicle may be used for various location-based analyses. In addition, when an issue of correction between various equipment in the vehicle, that is, between the plurality of sensors S occurs, the correction process in FIG. 4 may be applied or utilized.

Returning to FIG. 1 again, the location integrating device 140 according to the present embodiment may integrate location information of the vehicle boarding/alighting point received from the public institution. The location integrating device 140 may derive the location information of the vehicle boarding/alighting point by integrating a plurality of public institution Application Programming Interfaces (APIs), and may derive the location information of the vehicle boarding/alighting point based on a speed for each major city route, the number of passengers for each boarding/alighting point of a whole country, and the number of passengers for each route for a specific region.

National institutions provide data related to public transportation including the bus, but various institutions scattered across the whole country manage the data, and data that are not integrated are provided through a number of APIs. The location integrating device 140 is a module that integrates the public data to perform nationwide data analysis. Location information of boarding/alighting points of buses of the whole country may be extracted through the location integrating device 140.

Hereinafter, as an example for obtaining the boarding/alighting point information of the vehicle, a method for obtaining information on a boarding/alighting point of the public transportation, for example, the bus that may be obtained from the public institution will be described.

Figure 5:
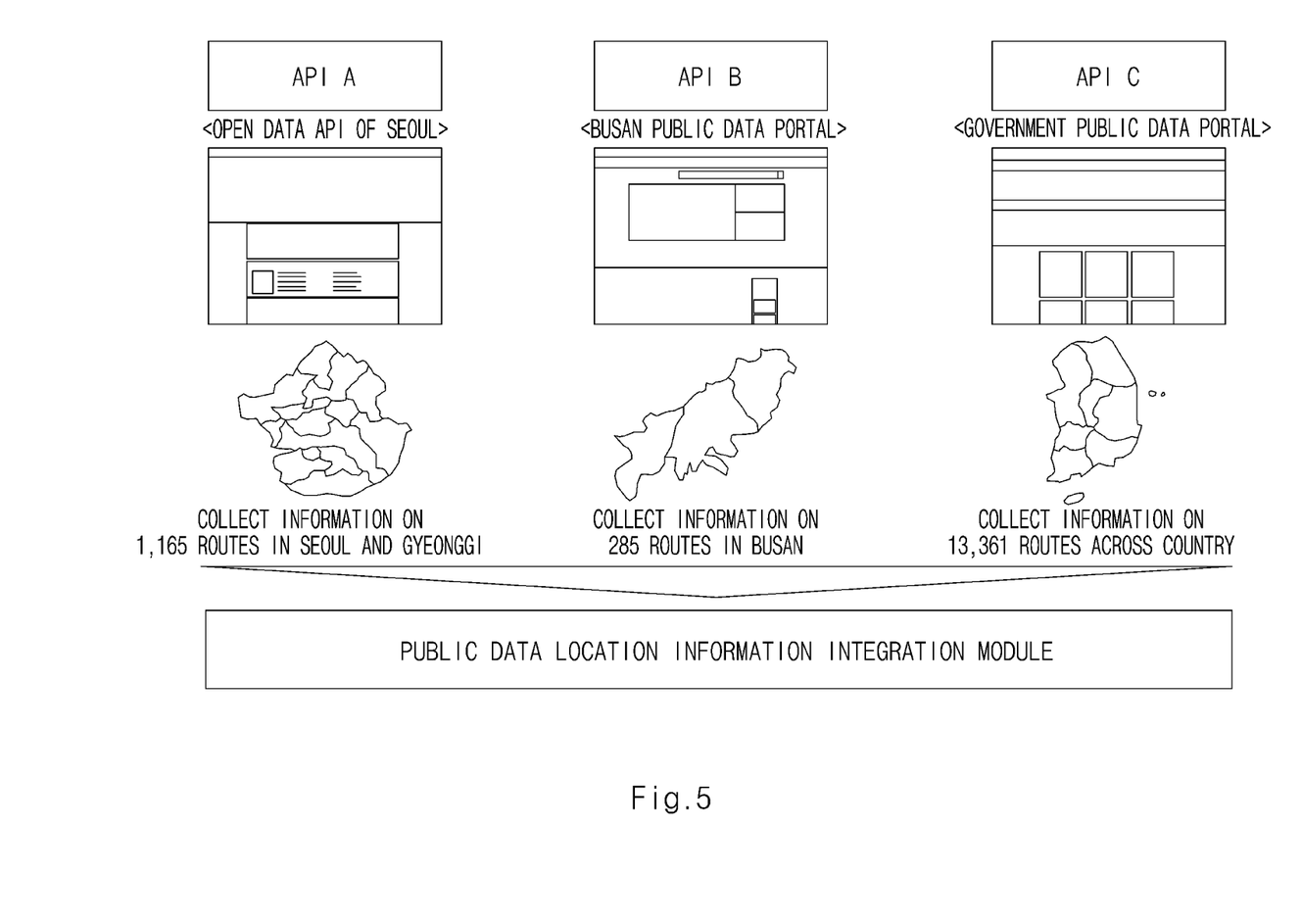
FIG. 5 is a view for illustrating public institution Application Programming Interface (API) integration according to an embodiment of the present disclosure.

FIG. 5 is a view for illustrating public institution API integration according to an embodiment of the present disclosure.

As shown, the location integrating device 140 may integrate an open data API of Seoul, a bus system API of Busan, and a public data API of the government, and additionally integrate information from other public institutions, such as a Gyeonggi Bus API or a Ministry of Land, Infrastructure, and Transport API.

In addition, the location integrating device 140 may additionally utilize the speed information for each major city route from the Korea Transportation Safety Authority, the number of passengers for each boarding/alighting point of the whole country provided from the Korea Transportation Safety Authority, the number of passengers for each Gyeonggi route provided from the Gyeonggi Traffic Information Center, and the like.

As such, as the location information of the boarding/alighting point is extracted by integrating the APIs of the plurality of government institutions, the location information of the boarding/alighting points of the buses of the whole country may be easily and accurately identified, and latest information may be collected in real time through API updates.

The identifier generator 150 may generate a boarding/alighting point identifier related to a location of the boarding/alighting point in the location data of the vehicle based on the location information of the vehicle boarding/alighting point.

The identifier generator 150 corresponds to a module responding to a request of generating a new operation unit in which information on a boarding/alighting point unit, the location data of the vehicle, and the location information of the boarding/alighting point provided by the government are integrated to identify a starting point and an ending point for each vehicle boarding/alighting point section based on vehicle location data collection information in the vehicle.

In the present disclosure, the identifier generator 150 may generate a turning identifier related to a turning point in the location data of the vehicle based on turning point information of the vehicle obtained from the location integrating device 140, identify a point of time at which the vehicle arrives the boarding/alighting point based on the location information of the boarding/alighting point, and generate the boarding/alighting point identifier in the location data of the vehicle corresponding to the boarding/alighting point arrival point of time. This will be described with reference to FIG. 6 as follows.

Figure 6:
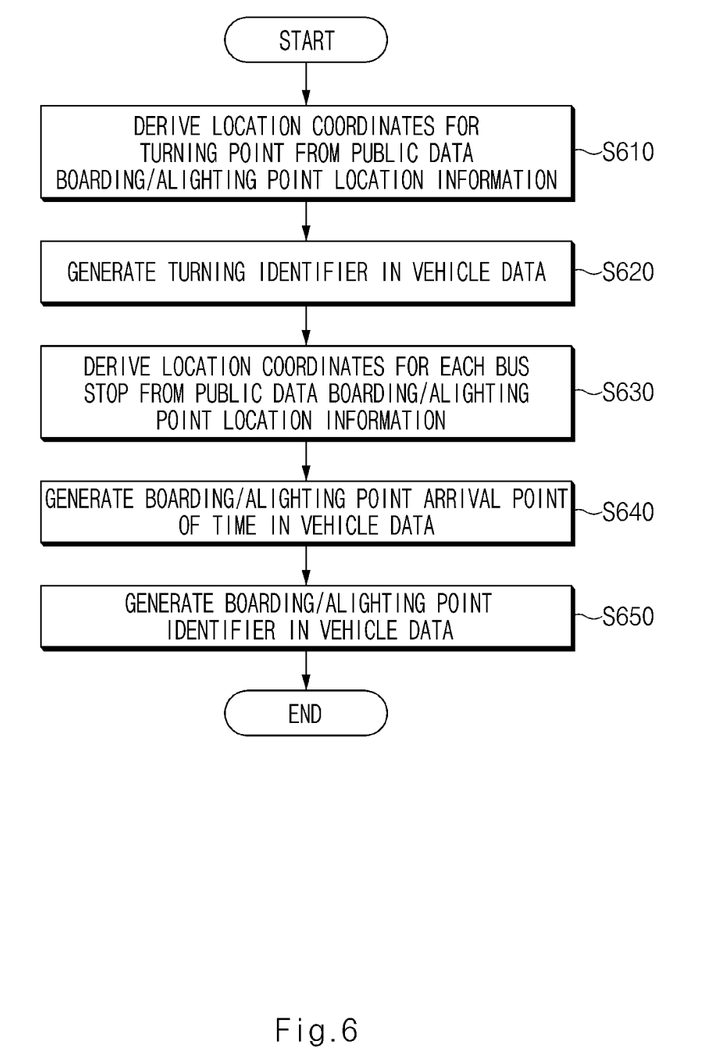
FIG. 6 is a control flowchart for illustrating a process of generating a boarding/alighting point identifier according to an embodiment of the present disclosure.

FIG. 6 is a control flowchart for illustrating a process of generating a boarding/alighting point identifier according to an embodiment of the present disclosure.

First, the identifier generator 150 derives location coordinates for the turning point from the public data boarding/alighting point location information of the location integrating device 140 (S610), and generate the turning identifier in the vehicle data based on the derived location coordinates (S620).

Because such turning identifier is required to distinguish an up line and a down line in the same section, the turning point may be used as the turning identifier.

The identifier generator 150 may derive the boarding/alighting point location coordinates from the public data boarding/alighting point location information of the location integrating device 140 (S630), and generate the boarding/alighting point arrival point of time of the vehicle based on the derived boarding/alighting point location coordinates (S640).

The identifier generator 150 may calculate a minimum distance for each vehicle time axis based on a turning location for each route and the boarding/alighting point location, and may regard a location coordinate point in the vehicle data closest to each boarding/alighting point coordinate as a point passed by the vehicle.

When the bus stop arrival point of time of the vehicle is derived, a location of the vehicle corresponding to the arrival point of time may be the location coordinate closest to the location of the boarding/alighting point, and the identifier generator 150 may generate the boarding/alighting point identifier in the location data of the vehicle based on the location coordinates (S650).

In summary, the identifier generator 150 may utilize latitude and longitude coordinates for each time axis within the vehicle time series data and boarding/alighting point location information for each bus route provided by the government to generate boarding/alighting point unit in vehicle operation data.

Therefore, boarding/alighting point unit information subdivided under the operation unit for information on the vehicles operating on the same route may be generated, and more accurate operation information may be identified through an operation pattern between the starting point and the ending point of the vehicle boarding/alighting point section. In addition, change factors such as an external environment and the like that affect the vehicle within an entire route section may be identified for each boarding/alighting point section.

Figure 7:
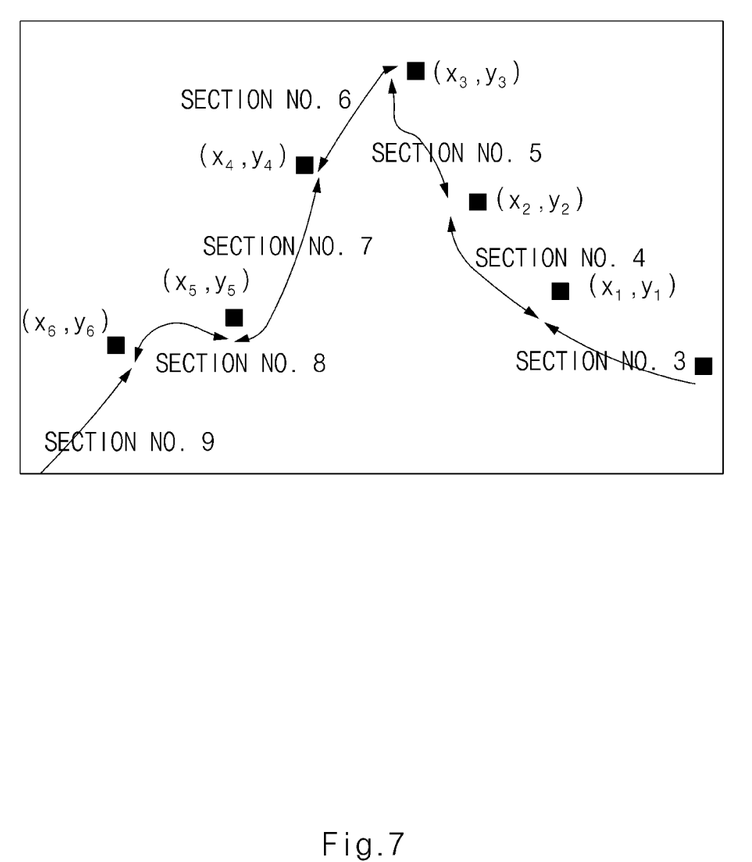
FIG. 7 is a diagram illustrating a boarding/alighting point identifier according to an example of the present disclosure.

FIG. 7 is a diagram illustrating a boarding/alighting point identifier according to an example of the present disclosure.

As shown, the boarding/alighting point of the vehicle may be distinguished based on the location information. A plurality of boarding/alighting points may be identified by location coordinates (x, y) that may identify boarding/alighting point locations, and whether the vehicle is in the up line or the down line may be determined by the turning identifier.

According to the present embodiment, a location of each turning point and each boarding/alighting point may be recognized in real-time operation data using the extracted/processed/stored vehicle location data and the public data boarding/alighting point location information. In addition, as shown in FIG. 7, a boarding/alighting point order may be arranged based on an operation direction of the vehicle, and a generated separator for each boarding/alighting point may be stored to be used as an analysis unit.

In one example, the identifier generator 150 according to an example may match the GPS information collected from the vehicle and the location coordinates for each boarding/alighting point of the public data by adjusting a decimal place to match the boarding/alighting point information with the real-time data. In addition, the information on the turning point and information on an arrival point are generated and displayed together, so that a user may easily recognize information on a travel path and a route of the vehicle and detailed features of each boarding/alighting point.

As described above, the present disclosure generates the identifier in the vehicle data such that the changes factors such as the vehicle, the external environment, and the like that affect a vehicle efficiency may be accurately analyzed for each boarding/alighting point section, and provides a data preprocessing method for the same.

Further, according to the present disclosure, elaborate and advanced analysis design may be possible through utilization of detailed information in units of the boarding/alighting points, and data consistency and expandability for various external data may be secured.

In addition, in detail, analysis results may be grafted to a vehicle route and a boarding/alighting point infrastructure that were previously operated, and the boarding/alighting point unit information subdivided under the operation unit may be generated for the information on the vehicles operating on the same route. The more accurate operation information may be identified through the operation pattern between the starting point and the ending point of the boarding/alighting point section, and the change factors such as the external environment and the like that affect the vehicle within the entire route section may be identified for each boarding/alighting point section. In addition, therefore, an analysis design customized for each region/route/boarding/alighting point for the vehicle operation is possible.

In addition, when the loading and the management of the collected data is necessary, the data may be integrated into one table after the data integration by applying the corresponding algorithm in the pre-processing process before the data loading, the sophisticated location of the vehicle may be measured through the adjustment of the time axis, and the sophisticated location of the vehicle may be used for the various location-based analyses.

Figure 8:
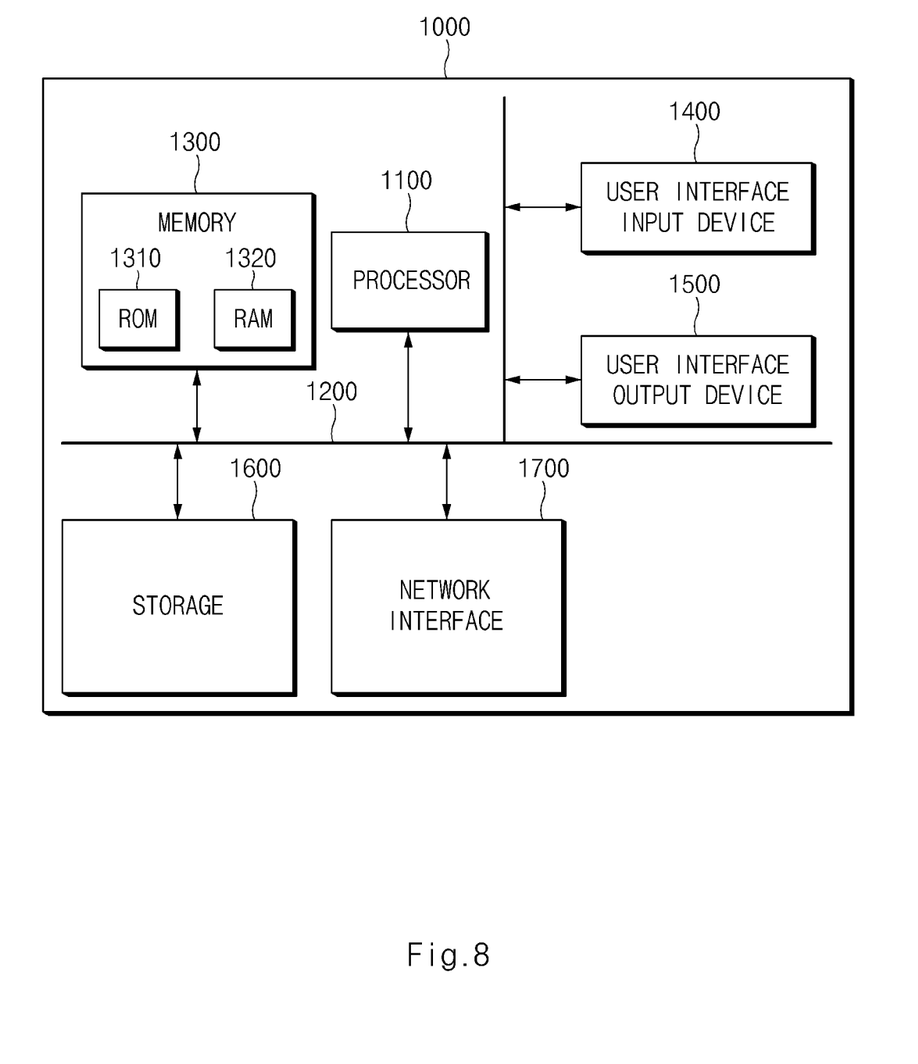
FIG. 8 illustrates a computing system according to an embodiment of the present disclosure.

FIG. 8 illustrates a computing system according to an embodiment of the present disclosure.

With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

An embodiment of the present disclosure provides the device and the method capable of accurately analyzing the change factors such as the vehicle, the external environment, and the like that affect the electric vehicle efficiency for each boarding/alighting point section.

In addition, an embodiment of the present disclosure provides the device and the method capable of synchronizing the vehicle time series data and the GPS data used to implement the method, and identifying the data consistency.

An embodiment of the present disclosure provides the device and the method that performs the data integration that may be applied when storing and managing the collected data.

In addition, an embodiment of the present disclosure provides the device and the method capable of measuring the sophisticated location of the vehicle through the time axis adjustment and implementing the algorithm that may be utilized for the various location-based analyses.

Therefore, when the issue of the correction between the various equipment occurs, the algorithm in this document may be applied.

In addition, an embodiment of the present disclosure provides the device and the method capable of generating the vehicle boarding/alighting point unit information subdivided under the operation unit for the information on the vehicles operating on the same route.

In addition, an embodiment of the present disclosure provides the device and the method capable of identifying the operation pattern between the starting point and the ending point of the vehicle boarding/alighting point section to identify the more accurate operation information.

Therefore, the change factors such as the external environment that affect the vehicle within an entire route section may be identified for each boarding/alighting point section.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for generating vehicle data-based boarding and alighting point information, the device comprising:
    a memory configured to store algorithm steps; and
    a processor configured to execute the algorithm steps, and configured to:
        resample a plurality of time series data based on a preset first time, wherein the plurality of time series data are received from a plurality of sensors included in a vehicle and include first speed data of the vehicle;
        resample GPS data based on a preset second time, wherein the GPS data are related to a GPS of the vehicle and include second speed data of the vehicle;
        integrate the time series data and the GPS data based on the first speed data, the second speed data, and Dynamic Time Warping (DTW) algorithm, and obtain location data of the vehicle from the integrated data;
        integrate location information of a vehicle boarding point and a vehicle alighting point received from a public institution; and
        generate a boarding point identifier and an alighting point identifier related to a location of the boarding point and the alighting point, respectively, in the location data of the vehicle based on the location information of the vehicle boarding point and the vehicle alighting point,
    wherein the processor is further configured to:
        calculate Euclidean distances of the first speed data and the second speed data for each time axis;
        select minimum distance ordered pairs with minimum Euclidean distances; and
        integrate the time series data and the GPS data based on the ordered pairs.

2. The device of claim 1, wherein the time series data output from the plurality of sensors include a plurality of variable data output at different time periods,
    wherein the processor is configured to resample the plurality of variable data based on the first time.

3. The device of claim 1, wherein the GPS data includes data on a latitude, a longitude, an azimuth, a second speed, and an altitude,
    wherein the processor is configured to generate a table obtained by extracting at least one of the data on the latitude, the longitude, the azimuth, the second speed, or the altitude with a predetermined period of time.

4. The device of claim 1, wherein the processor is configured to compare the first speed data with the second speed data so as to correct a time delay.

5. The device of claim 1, wherein the processor is configured to obtain the location information of the vehicle boarding point and the vehicle alighting point by integrating a plurality of public institution Application Programming Interfaces (APIs).

6. The device of claim 5, wherein the processor is configured to obtain the location information of the vehicle boarding point and the vehicle alighting point based on a speed for each major city route, a number of passengers for each of the boarding point and the alighting point of a whole country, and a number of passengers for each route for a specific region.

7. The device of claim 1, wherein the processor is configured to generate a turning identifier related to a turning point in the location data of the vehicle based on turning point information of the vehicle obtained from the location integrating device.

8. The device of claim 7, wherein the processor is configured to:
    identify a boarding point arrival point of time and an alighting point arrival point of time of the vehicle based on the location information of the boarding point and the alighting point, respectively, obtained from the location integrating device; and generate the boarding point identifier and the alighting point identifier in the location data of the vehicle corresponding to the boarding point arrival point of time and the alighting point arrival point of time.

9. A method for generating vehicle data-based boarding and alighting point information, the method comprising:
- a time series data processing operation of receiving a plurality of time series data including first speed data of a vehicle from a plurality of sensors of the vehicle, and resampling the time series data based on a preset first time;
- a Global Positioning System (GPS) data processing operation of resampling GPS data, which are related to a GPS of the vehicle and including second speed data of the vehicle based on a preset second time;
- a location data deriving operation of integrating the time series data and the GPS data based on the first speed data, the second speed data, and Dynamic Time Warping (DTW) algorithm, and obtaining location data of the vehicle from the integrated data;
- a location integrating operation of integrating location information of a vehicle boarding point and a vehicle alighting point received from a public institution; and
- an identifier generating operation of generating a boarding point identifier and an alighting point identifier related to a location of the boarding point and the alighting point, respectively, in the location data of the vehicle based on the location information of the vehicle boarding point and the vehicle alighting point, wherein the location data deriving operation includes:
calculating Euclidean distances of the first speed data and the second speed data for each time axis;
selecting minimum distance ordered pairs with minimum Euclidean distances; and
integrating the time series data and the GPS data based on the ordered pairs.

10. The method of claim 9, wherein the time series data output from the plurality of sensors include a plurality of variable data output at different time periods,
wherein the time series data processing operation includes resampling the plurality of variable data based on the first time.

11. The method of claim 9, wherein the GPS data includes data on a latitude, a longitude, an azimuth, a second speed, and an altitude,
wherein the GPS data processing operation includes:
generating a table obtained by extracting at least one of the data on the latitude, the longitude, the azimuth, the second speed, or the altitude with a predetermined period of time.

12. The method of claim 9, wherein the location data deriving operation includes comparing the first speed data with the second speed data so as to correct a time delay.

13. The method of claim 9, wherein the location integrating operation includes: obtaining the location information of the vehicle boarding point and the vehicle/alighting point by integrating a plurality of public institution Application Programming Interfaces (APIs).

14. The method of claim 13, wherein the location integrating operation includes deriving the location information of the vehicle boarding point and the vehicle alighting point based on a speed for each major city route, a number of passengers for each of a boarding point and a alighting point of a whole country, and a number of passengers for each route for a specific region.

15. The method of claim 9, wherein the identifier generating operation includes generating a turning identifier related to a turning point in the location data of the vehicle based on turning point information of the vehicle obtained from the location integrating device.

16. The method of claim 15, wherein the identifier generating operation includes:
identifying a boarding point arrival point of time and an alighting point arrival point of time of the vehicle based on the location information of the boarding point and the alighting point, respectively, obtained from the location integrating device; and
generating the boarding point identifier and the alighting point identifier in the location data of the vehicle corresponding to the boarding point arrival point of time and the alighting point arrival point of time, respectively.

* * * * *